INVENTOR.
JAMES M. EASTMAN
BY
AGENT

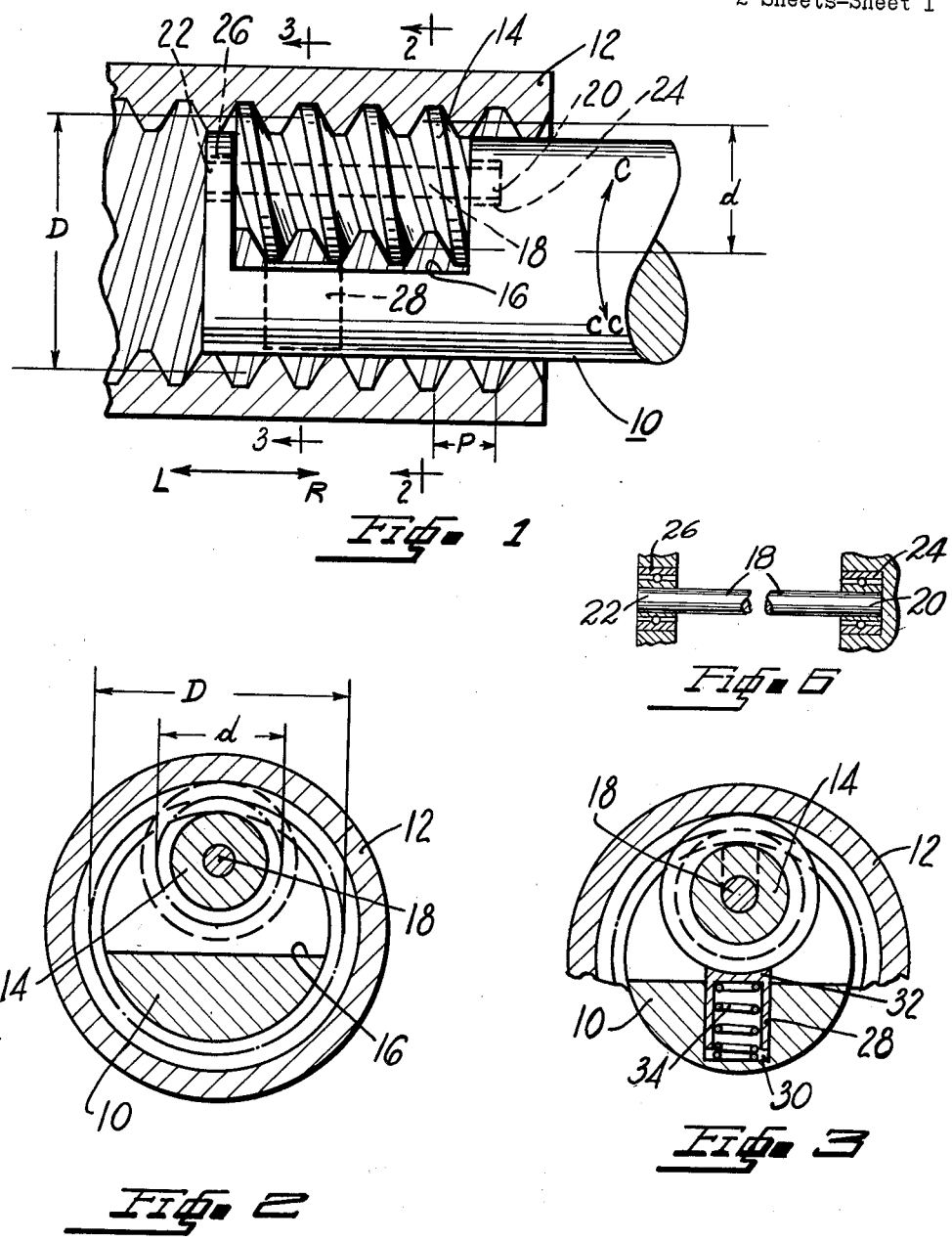

United States Patent Office 3,128,634
Patented Apr. 14, 1964

3,128,634
SCREW ACTUATOR
James M. Eastman, South Bend, Ind., assignor to The Bendix Corporation, South Bend, Ind., a corporation of Delaware
Filed Feb. 21, 1962, Ser. No. 174,902
9 Claims. (Cl. 74—424.8)

This invention relates, in general, to screw actuators and, in particular, to a screw mechanism having a plurality of members threadedly engaged whereby rotational movement of an input member is converted to linear movement of an output member.

Various forms of screw actuators are known among which actuators is the differential screw and nut mechanism which utilizes rotatably actuated input screw member, a stationary nut member, and an output nut member threadedly engaged with the input screw member. Another form of screw actuator is the ball screw mechanism which utilizes balls to provide rolling contact between a rotatably actuated input threaded member and a linearly actuated output threaded member.

Each of the abovementioned two forms of screw actuators have disadvantages which are well known to those persons skilled in the appropriate art. For instance, the differential screw and nut mechanism is subject to irreversibility, wear of screw threads, undesirable play between the threaded input and output members and sliding friction between engaged threaded input and output members which friction promotes inefficiency of operation. Both the differential screw and the ball screw mechanisms require infinitely variable thread pitch to secure infinitely variable output movement per revolution of the input member. The ball screw is very limited in how small this output movement can be.

It is therefore an object of the present invention to provide a screw drive mechanism actuator having low friction losses.

It is another object of the present invention to provide a differential screw linear actuator having the characteristics of a low ratio of linear output movement to rotational input movement.

It is an important object of the present invention to provide a differential screw linear actuator which is compact, relatively simple in structure and relatively inexpensive to manufacture.

It is still another important object of the present invention to provide an efficient and precise screw drive mechanism.

Another important object of the present invention is to provide a differential screw linear actuator capable of providing a position output signal which varies as a function of a rotary input signal over a wide range of values of the input signal.

Other important objects and advantages of the present invention will become apparent from the following description taken in conjunction with the accompanying drawings wherein:

FIGURE 1 is a schematic representation of the present invention;

FIGURE 2 is a sectional view taken on line 2—2 of FIGURE 1;

FIGURE 3 is a sectional view taken on line 3—3 of FIGURE 1;

Figure 4:
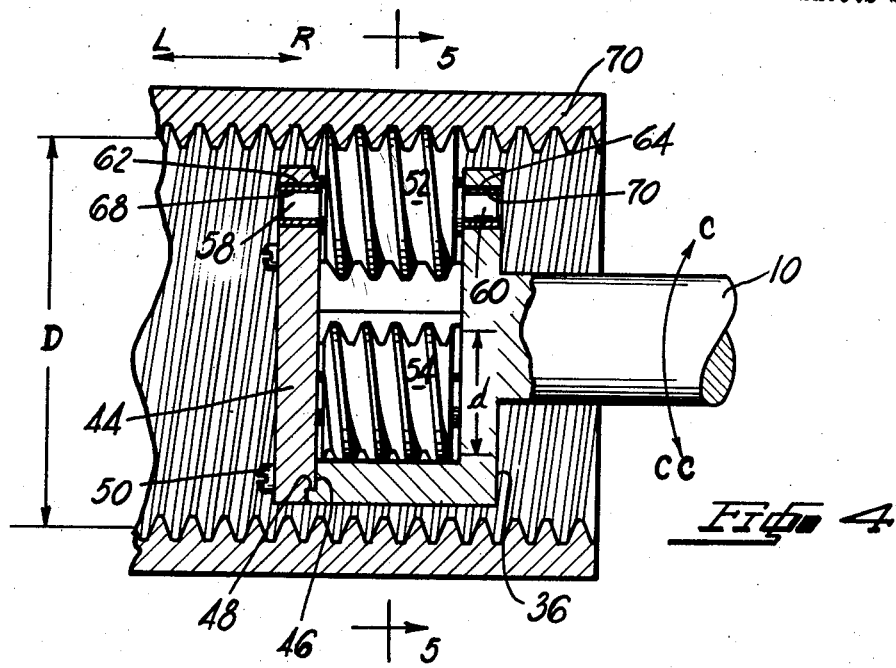
FIGURE 4 is a schematic representation of a second embodiment of the present invention.

FIGURE 6 discloses a portion of FIGURE 1 wherein the sleeve type bearings are replaced by anti-friction ball bearings.

Referring to FIGURES 1, 2 and 3, numeral 10 designates an input member or spindle rotatably mounted but axially secured by any suitable conventional means, not shown. The spindle 10 is rotatably actuated by motor means, not shown. The motor means forms no part of the present invention and may take the form of any conventional mechanism adapted to rotate spindle 10. The spindle 10 is rotatably carried by an internally threaded double threaded cylinder or nut 12 having a pitch diameter D and a thread pitch P. The cylinder or nut 12 is mounted for axial movement but secured against rotational movement by any suitable conventional means, not shown. The axial movement of the cylinder or nut 12 in the direction L or R is indicative of the degree of rotational movement of the spindle 10 in the directions C or CC. A screw member 14 provided with a single screw thread is threadedly engaged with the cylinder or nut 12, has a pitch diameter $d$ and a thread pitch P. The screw member 14 is rotatably supported in a recess 16 in spindle 10 by a shaft 18 extending axially through screw member 14 and journaled at opposite end portions 20 and 22 in bearings 24 and 26, respectively, which bearings are suitably secured in openings formed in spindle 10.

The bearings 24 and 26, as shown, are of the sleeve type but may be replaced by anti-friction ball bearings if minimum frictional effect is desired. However, in view of the rolling action between the screw member 14 and the cylinder or nut 12 in which the screw member 14 rides, the frictional effect, in general, will be relatively low in comparison to conventional screw mechanisms which have sliding action between the driving screw and the driven nut. Since the frictional resistance in applicant's screw drive mechanism is relatively low, there exists the possibility of a reverse action when the input torque on spindle 10 is removed. To eliminate the possibility of such reverse action, a spring loaded friction brake (see FIGURE 3) may be incorporated. The friction brake may include a tubular member 28 slidably carried in a bore 30 formed in spindle 10 and extending radially outwardly from the bottom of the recess 16. A closed end portion 32 of the tubular member 28 is adapted to engage and drag as a brake against the crests of the thread of the screw member 14. A spring 34 interposed between the closed end of bore 30 and the end portion 32 serves to urge the end portion 32 into frictional engagement with the screw member 14. Of course, if the abovementioned reverse action constitutes no problem and maximum efficiency of the screw drive is to be attained, the friction brake may be eliminated.

It will be assumed that the input member, spindle 10, makes one revolution in the direction C. If the screw member 14 were fixed relative to spindle 10, the one revolution of spindle 10 would result in movement of cylinder or nut 12 in the direction R through a distance equal to 2P by virtue of the double thread on the cylinder or nut 12. However, with the screw member 14 rotatably carried on spindle 10, and in rolling contact with nut 12, the one revolution of spindle 10 causes the screw member 14 to revolve in a direction opposite to that of spindle 10 through $D/d$ revolutions. It will be noted that, if the input member 10 were fixed, the screw member 14 would cause the cylinder or nut 12 to move in the direction L through a distance equal to $$P\left(\frac{D}{d}\right)$$

by virtue of the single thread on the screw member. In view of the single and double thread relationship between screw member 14 and cylinder or nut 12, a thread-pitch diameter relationship of $$\frac{D}{d}=2$$

would thus result in no movement of cylinder or nut 12 for the abovementioned one revolution of spindle 10. However, if $D/d$ does not equal 2, the cylinder or nut 12 must move in the direction R through a distance equal to $$2 - \frac{D}{d}$$

thread-pitches for each rotation of spindle 10. If $D/d$ is less than 2 the cylinder or nut 12 will move in the direction R and if $D/d$ is greater than 2 the cylinder or nut 12 will move in the direction L. Therefore, it is possible to produce extremely small linear movment of the cylinder or nut 12 for each revolution of spindle 10 by making the thread-pitch diameter D of the cylinder or nut 12 very close to two times the thread-pitch diameter $d$ of the screw member 14. It will be understood that the relationship between linear travel of cylinder or nut 12 and rotational movement of spindle 10 can be varied by selecting the proper ratio of thread-pitch diameters $D/d$ as desired. In some applications it may be desired to produce a slow output movement of cylinder or nut 12 for high rotary input speeds of spindle 10 over a relatively wide range of input speeds whereas other applications may dictate a fast output movement of the cylinder or nut 12 for relatively low rotary input speeds of spindle 10. In either case, the present invention is readily adaptable to modifications to meet the required performance.

Figure 5:
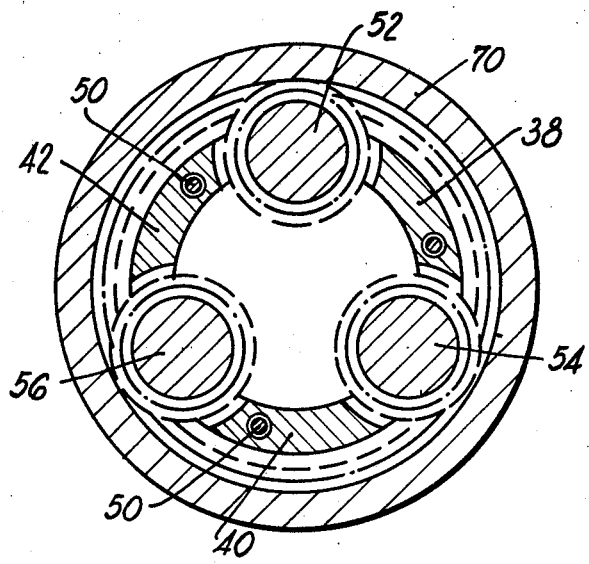
FIGURE 5 is a sectional view taken on line 5—5 of FIGURE 4.

Referring to FIGURES 4 and 5, a second embodiment of the present invention is shown wherein the rotatably actuated spindle 10 is provided with a radially extending flange portion 36 and three axially extending, circumferentially spaced, arcuate wall members 38, 40 and 42 which extend from flange portion 36 into engagement with a circular plate 44. The wall members 38, 40 and 42 are provided with recesses 46 which are adapted to receive a reduced diameter section 48 of plate 44. Bolts 50 extend through openings in plate 44 into threaded engagement with wall members 38, 40 and 42 to thereby lock plate 44 in position. Equally spaced apart screw members 52, 54 and 56 are each provided with a single screw thread having a pitch diameter $d$ and are rotatably carried in the spaces defined by the circumferentially spaced wall members 38, 40 and 42. Each of the screw members 52, 54 and 56 is provided with stub shafts 58 and 60 which are journaled in openings 62 and 64, respectively, in plate 44 and flange portion 36. The stub shafts 58 and 60 are journaled in sleeve bearings 68 and 70, respectively. However, anti-friction ball bearings, FIGURE 6, may be substituted for sleeve bearings 68 and 70 as in the case of FIGURE 1, if a minimum frictional effect is desired. Enlarged diameter portions 66 and 68 of stub shafts 58 and 60, respectively, abut respective adjacent surfaces of plate 44 and flange portion 36 to thereby maintain a spaced relationship between screw member 52 and 54, and 56 and the adjacent surfaces of plate 44 and flange portion 36 and to provide thrust bearing surfaces to carry linear actuator loads.

The screw members 52, 54 and 56 extend radially outwardly into threaded engagement with an internally threaded triple threaded cylinder or nut 70 having a thread-pitch diameter D. The cylinder or nut 70, like the cylinder or nut 12 of FIGURE 1, is mounted for axial but not rotational movement.

Assuming that the motor means, not shown, caused one revolution of the spindle 10 in the direction C, the cylinder or nut 66 will be actuated in the direction R through a distance equal to $$3 - \frac{D}{d}$$

thread-pitches by virtue of the single and triple thread relationship between screw members 52 and 54 and 56 and cylinder or nut 66. It will be noted that the screw members 52, 54 and 56 roll within cylinder or nut 66 which rolling action results in no movement of cylinder or nut 66 if the relationship of thread-pitch diameters $D/d$ is equal to 3 whereas movement in direction L or R will occur by virtue of the relationship $D/d$ being greater than or less than 3, respectively. Also, the degree of output movement of cylinder or nut 66 for one revolution of spindle 10 will depend upon the relationship $D/d$ which for minimum output movement should be very close to 3. Of course, as $D/d$ increases or decreases beyond 3, the degree of output movement of cylinder or nut 66 for one revolution of spindle 10 will increase accordingly.

The embodiment shown in FIGURE 4 has one significant advantage over the embodiment of FIGURE 1 in that the spindle 10 of the former is not supported directly by the cylinder or nut 66 whereas spindle 10 of the latter bears against the crest of the screw thread of cylinder or nut 12. In view of the reduced frictional effect and corresponding gain in efficiency of the embodiment of FIGURE 4 over that of FIGURE 1, the embodiment of FIGURE 4 may be considered the more practical of the two embodiments.

It will be understood that various changes and modifications in the structure shown and described which represents but two embodiments of applicant's invention may be made by those persons skilled in the art without departing from the spirit of the invention.

I claim:

1. A screw actuating mechanism adapted to provide a linear output movement in response to a rotary input movement comprising:
   a rotatable input member fixed against axial movement thereof,
   a screw member rotatably carried by said input member and rotatable about an axis parallel to and displaced radially outwardly from the axis of rotation of said input member,
   a threaded member threadedly engaged with said screw member and movable axially in response to movement of said screw member,
   said screw member being provided with a single screw thread, and
   said threaded member being provided with a multiple screw thread.

2. A screw actuating mechanism as claimed in claim 1 wherein said threaded member is provided with a bore and an internal multiple screw thread with which said screw member is threadedly engaged, said screw member and said threaded member having rolling contact.

3. A screw actuating mechanism adapted to provide a linear output movement in response to a rotary input movement comprising:
   an axially movable output member having a bore and an internal multiple screw thread,
   an input member rotatably carried in said bore and concentric therewith,
   a screw member provided with a single screw thread and rotatably carried by said input member for rotation about an axis parallel to and displaced radially outwardly from the axis of rotation of said input member,
   said screw member being threadedly engaged with said output member and having a pitch diameter less than the pitch diameter of said multiple screw thread, and
   said screw member having rolling contact with said output member whereby, for one revolution of said input member, said screw member is caused to rotate $D/d$ revolutions and said axially movable output member is caused to move $$\left(A - \frac{D}{d}\right)$$

thread-pitches wherein the variable A represents the number of screw threads formed on said output member, the variable D represents the pitch diameter of the multiple screw thread and the variable $d$ represents the pitch diameter of the screw member.

4. A screw actuating mechanism adapted to provide a linear output movement in response to a rotary input movement comprising:

an output member provided with a bore and an internal multiple screw thread of pitch diameter D,
an input member rotatably carried in said bore and concentric therewith,
a screw member provided with an external single screw thread of pitch diameter $d$ and rotatably carried by said input member for rotation about an axis parallel to and displaced radially outwardly from the axis of rotation of said input member, and
said screw member and said output member being threadedly engaged and having a pitch diameter relationship $D \neq Ad$ wherein A designates the number of screw threads formed on said output member and D and $d$ represent the pitch diameters of said multiple screw thread and single screw thread, respectively.

5. A screw actuating mechanism adapted to provide a linear output movement in response to a rotary input movement comprising:

an axially movable output member having a bore and a multiple screw thread formed in the wall of said bore,
an input member rotatably carried in said bore and concentric therewith,
a plurality of screw members each having a single screw thread formed thereon and being rotatably carried in spaced relationship by said input member for rotation about an axis parallel to and displaced radially outwardly from the axis of rotation of said input member,
said plurality of screw members extending radially outwardly from said axis beyond the radially outermost edge of said input member into threaded engagement with said multiple screw thread to thereby support said input member in concentric relationship with said bore, and
said plurality of screw members having rolling contact with said output member in response to rotation of said input member.

6. A screw actuating mechanism adapted to provide a linear output movement in response to a rotary input movement comprising:

an axially movable output member having a bore and a multiple screw thread formed in the wall of said bore,
an input member rotatably carried in said bore and concentric therewith,
first, second and third screw members having a single screw thread formed thereon and being rotatably carried in equally spaced apart relationship by said input member on first, second and third axes, respectively, parallel to and displaced radially outwardly from the axis of rotation of said input member,
said first, second and third screw members extending radially outwardly from their respective axes beyond the radially outermost edge of said input member into threaded engagement with said multiple screw thread to thereby support said input member in concentric relationship with said bore, and
said first, second and third screw members having rolling contact with said output member in response to rotation of said input member.

7. A screw actuating mechanism adapted to provide a linear output movement in response to a rotary input movement comprising:

an axially movable, rotatably fixed annular output member having a multiple screw thread formed on its radial inner surface, an input member concentric with and rotatably carried by said output member and provided with a radially outwardly extending flanged portion having a plurality of axially extending, equally spaced apart, wall portions,
a screw member having a single screw thread and being rotatably supported at one end by said flanged portion for rotation between adjacent arcuate wall portions about an axis parallel to and displaced radially outwardly from the axis of said input member,
a cap member secured to the free end of said wall portions and adapted to rotatably support the opposite end of said screw member, and
said screw member having rolling contact with said output member in response to rotation of said input member.

8. In a screw actuating mechanism as claimed in claim 7 wherein said screw member is rotatably carried at opposite ends in anti-friction ball bearings.

9. A screw actuating mechanism as claimed in claim 4 including a spring loaded member carried by said input member and extending into frictional engagement with said screw member to thereby prevent reversing movement of said screw member when the input load on said input member is removed.

References Cited in the file of this patent

UNITED STATES PATENTS

| 2,831,363 | Lohr | Apr. 22, 1958 |
| 3,004,445 | Mondon | Oct. 17, 1961 |

FOREIGN PATENTS

| 1,199,429 | France | June 22, 1959 |
| 1,203,750 | France | Aug. 3, 1959 |